United States Patent

[11] 3,586,181

| [72] | Inventor | James D. Brock |
| | | Chattanooga, Tenn. |
| [21] | Appl. No. | 831,575 |
| [22] | Filed | June 9, 1969 |
| [45] | Patented | June 22, 1971 |
| [73] | Assignee | CMI Cororation |
| | | Oklahoma City, Okla. |

[54] PORTABLE SELF-ERECTING SILO
8 Claims, 7 Drawing Figs.

[52] U.S. Cl. .................................................. 214/17, 214/41
[51] Int. Cl. ................................................. B65g 67/08
[50] Field of Search .......................................... 214/16, 17, 2, 41; 259/153, 154, 169

[56] References Cited
UNITED STATES PATENTS

| 2,136,869 | 11/1938 | Spears | 259/153 |
| 2,310,592 | 2/1943 | Noble | 214/2 |
| 3,142,390 | 7/1964 | Preeman | 214/17 |
| 3,385,571 | 5/1968 | Preeman | 214/17 UX |

Primary Examiner—Robert G. Sheridan
Attorney—Jones and Thomas

ABSTRACT: A portable, self-erecting silo assembly utilized for temporarily storing asphaltic mix comprising an elongated wheeled framework suitable for towing behind a motorized vehicle, a support frame carried at one of the ends of the framework and defining a space adjacent the ground surface for the passage of dump trucks or the like. A sectional telescoping container including a cylindrical outer element and a conical inner element is telescopically received in the support frame and movable from the space defined in the support frame in an upward direction to an expanded configuration generally above the space defined by the support frame. A drag chain conveyor is supported at one of its ends at the other end of the framework and has its delivery end connected to the cylindrical section of the container and is vertically movable with the container from a low profile or collapsed position to a high profile or operational condition.

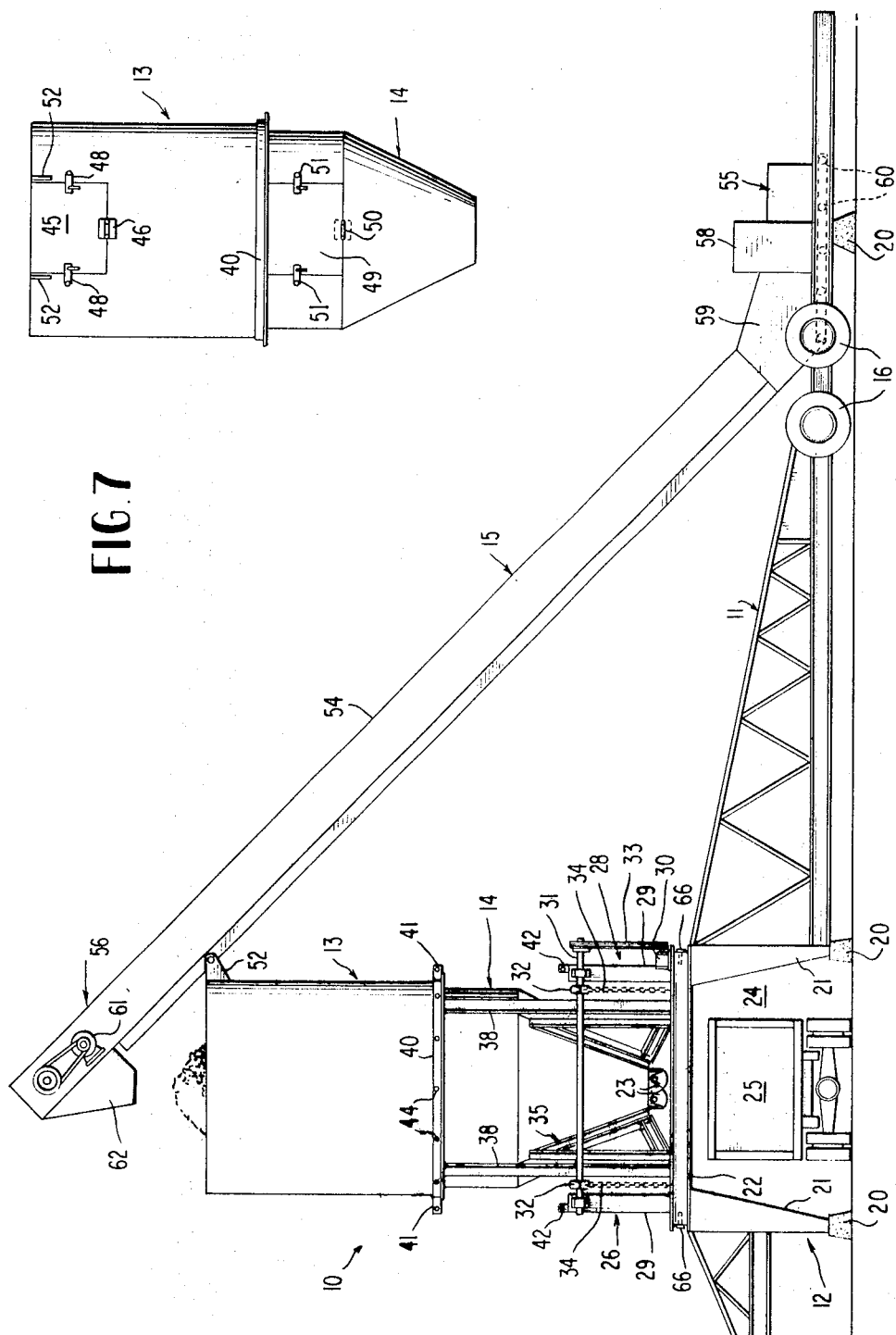

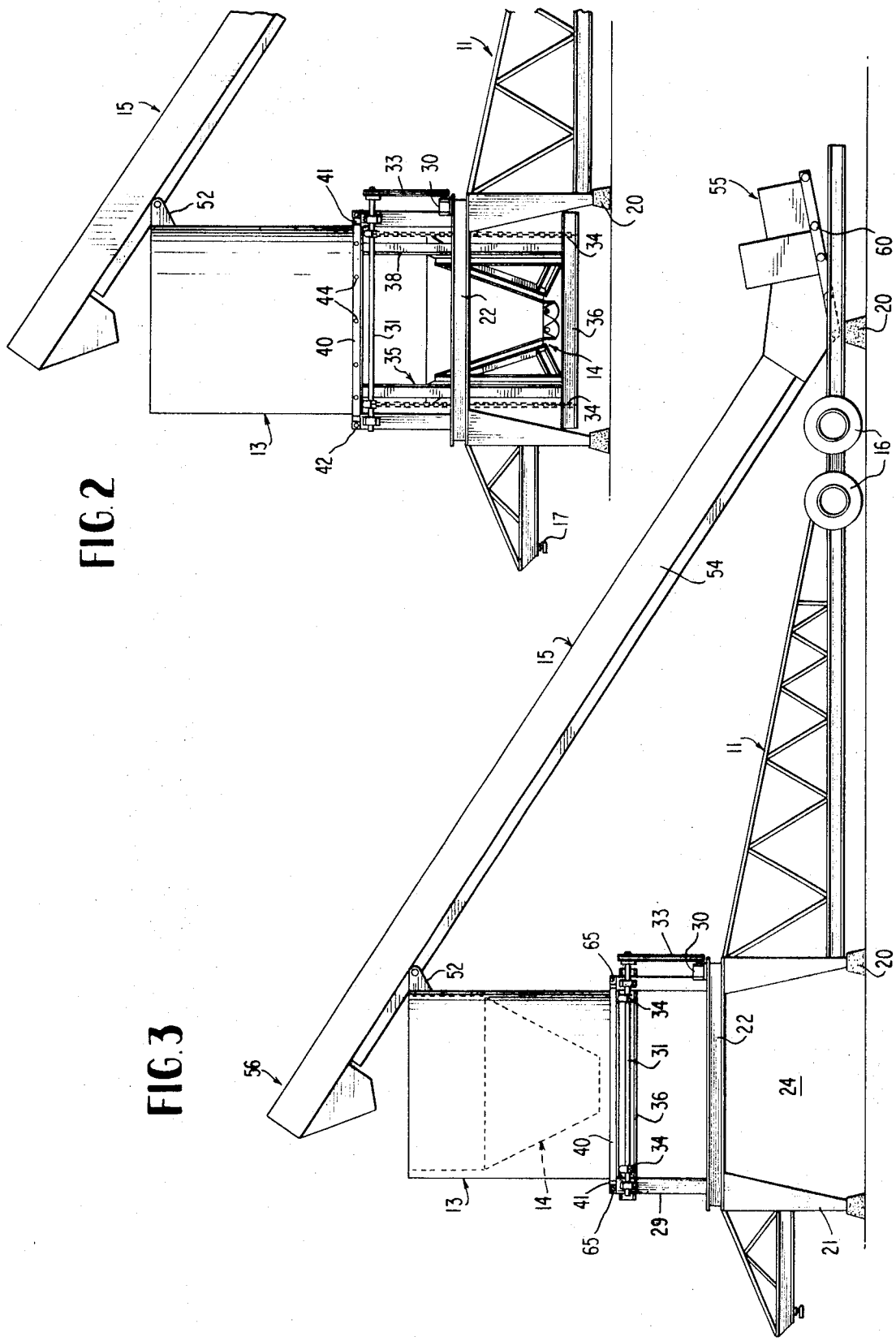

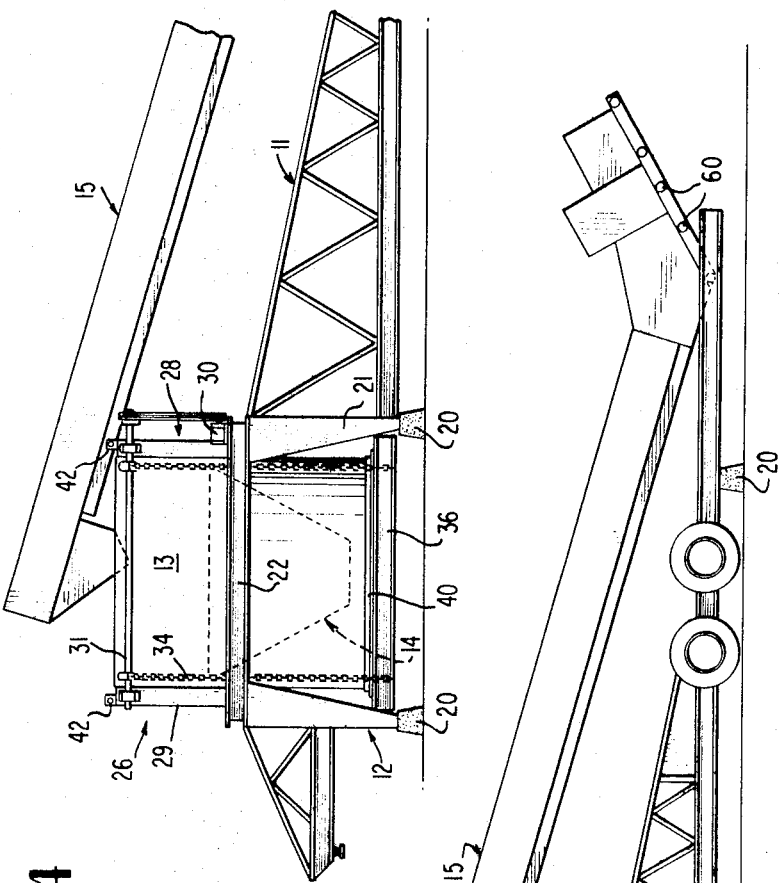

PORTABLE SELF-ERECTING SILO

BACKGROUND OF THE INVENTION

When paving roads with asphalt mix, it is usually desirable to prepare the mix at a location close to the construction site so that the dump trucks or other vehicles carrying the mix from the mix preparation and storage plant do not have to travel a long distance. This reduces the number of trucks and drivers necessary for any given job, and the expense to the contractor.

In order to locate the mix preparation and storage plants adjacent construction sites, various plant configurations have been developed which are "portable" in that they can be expediently dismantled and transported to a location adjacent the construction site and then reassembled and put into operation. These plants are known as "gypsy" plants since they are movable from job site to job site; however, the typical gypsy plant still requires virtual disassembly of the components of the plant and individual transportation of most of the components from job site to job site. Of course, the dismantling and individual transportation of the elements of such a plant requires the plant to be shut down for an extended time, the use of cranes, trailers and other heavy equipment in the dismantling and erection procedures, and the use of skilled labor.

SUMMARY OF THE INVENTION

Briefly described, the present invention comprises a portable, self-erecting silo for storing and dispensing hot mix, such as asphalt or the like. The assembly comprises a sectional, telescoping container which can be collapsed in a vertical direction to form a low profile assembly suitable for transporting on public roads, and a drag chain conveyor transportable in a substantially horizontal attitude but movable to an inclined position over the expanded container when in operation. Hot mix is transferred from a mix preparation plant to the inlet end of the drag chain conveyor, whereupon the mix is deposited in the sectional container and stored. When a truck moves beneath the container, the hot mix is dispensed into the bed of the truck.

Thus, it is an object of this invention to provide a portable, self-erecting asphaltic mix storage silo for temporarily storing heated mix, and which can be converted from an operational configuration to a low profile, traveling configuration suitable for towing on a single trailer over public roads.

Another object of this invention is to provide a storage silo for heated asphaltic mix which can be rapidly converted from an operational condition to a compact traveling condition without the use of cranes or other special tools or equipment.

Another object of this invention is to provide a silo or surge bin for hot asphaltic mix which is inexpensive to initially construct and maintain, which is portable and can be transported from construction site to construction site and which can be expediently erected and collapsed from an operational attitude to a low profile traveling attitude.

Other objects, features and advantages of the present invention will become apparent upon reading the following specification, when taken into conjunction with the accompanying drawing.

BRIEF DESCRIPTION OF THE DRAWING

FIG. 1 is a side elevational view of the portable, self-erecting silo in its operational position.

FIGS. 2, 3, 4, 5, and 6 are side elevational views of the portable, self-erecting silo, showing the progressive stages of the assembly as it is moved from its operational configuration of FIG. 1 to its collapsed or traveling configuration of FIG. 6.

FIG. 7 is a partial side elevational view of the containers with the conveyor removed for clarity.

DESCRIPTION OF THE PREFERRED EMBODIMENT

Referring now in more detail to the drawing, in which like numerals indicate like parts throughout the several views, FIG. 1 shows a portable self-erecting silo assembly 10 which comprises framework 11, base frame 12, outer cylindrical container 13, inner conical container 14, and drag chain conveyor 15. Framework 11 is normally supported by wheels 16 at one end and by the fifth wheel 17 and by the wheels 18 of towing vehicle 10 at its other end (FIG. 6) when being transported from job site to job site. When the silo assembly is operational, it will be supported by various concrete piers 20 or the like.

As is shown in FIG. 1, base frame 12 comprises four upright legs 21 joined together at their upper portions by laterally extending rectangular frame 22. Legs 21 are spaced apart and rectangular frame 22 is high enough so that a space 24 is defined within base frame 12 which is sufficient to accommodate a dump truck 25 or similar load carrying vehicle.

A pair of hoists 26 and 28 are located on opposite sides of base frame 12. Each hoist comprises a pair of upright support posts 29 located at each corner of rectangular frame 22, a drive motor 30 mounted on rectangular frame 22 at one corner, a drive shaft 31 extending between the upper ends of posts 20 of a hoist 26 or 28, and sprockets 32 positioned adjacent posts 29. A roller drive chain 33 extends from each motor 30 to each drive shaft 31, and a roller lift chain 34 is threaded over each of the four sprockets 32 of hoists 26 and 28.

Inner conical container 14 comprises a framework 35 which includes rectangular horizontal frame 36 and upright support beams 38. One end of each chain 34 is kept in permanent connection with rectangular support frame 36 of conical container framework 35.

Outer cylindrical container 13 is of a diameter large enough to fit over inner conical container 14. Outer container 13 is telescopically movable with respect to inner container 14 and normally slides over the outer surfaces of upright supports 38 of inner conical container framework 35. The bottom edge of cylindrical container 13 terminates in outwardly protruding annular flange 40 which is of a diameter smaller than the largest dimension of rectangular frame 36 of conical support frame 35 but larger than the outside dimensions of upright support beams 38. Support tabs 41 are located at 90° intervals about annular flange 40 and protrude outwardly of the flange. Mating support tabs 42 are connected to each support post 29 of the hoists 26 and 28. Support tabs 41 and 42 each define apertures therein so that the apertures of the support tabs are alignable with each other and a connecting pin or the like is insertable through the apertures of the mated tabs 41 and 42, to connect cylindrical container 13 to the upper ends of support posts 29. Screws 44 are threadable through annular flange 40 and into the upper portion of conical container 14, to lock the containers together in a substantially fluid tight relationship.

As is shown in FIG. 7, cylindrical container 13 defines a door 45 which extends downwardly from its upper edge. Hinge 46 is mounted externally of the container and permits door 45 to rotate outwardly of the container about its lower edge. Latches 48 are mounted externally of the container and function to maintain door 45 in its closed position. Conical container 14 also includes a door 49 pivotal about hinge 50 in a similar manner but which rotates inwardly of its container, and latches 51 function to keep the door in its closed position. Hinge 50 and latches 51 are mounted so as to not interfere with the telescoping movement of cylindrical container 13 with respect to conical container 14. Doors 45 and 49 are dimensioned so that they are larger than the outside dimensions of drag chain conveyor 15. With this arrangement, drag chain conveyor 15 can be received in the openings of doors 35 and 49. Connecting tabs 52 are mounted at the upper external portion of cylindrical container 13 adjacent opposite edges of the upper portion of door 45. When doors 45 and 49 are placed in their closed positions and cylindrical container 13 and conical container 14 are moved to their expanded positions, drag chain conveyor 15 will be connected to connecting tabs 52 of cylindrical container 13 by the insertion of a connecting rod or the like through connecting tabs 52 and mating apertures (not shown) in the framework of drag chain conveyor 15.

Drag chain conveyor 15 is of substantially conventional construction in that it comprises an elongated conveyor housing or chain trough 54 with an inlet end 55 and a delivery end 56. An internal conveyor mechanism (not shown) is provided within chain trough 54 and functions to carry material from inlet end 55 to discharge end 56. Inlet end 55 includes an inlet hopper 58 which receives the material to be conveyed, and a drag chain transition chamber 59 which functions to change the direction of movement of the conveyor from a substantially horizontal direction of movement to an inclined direction of movement. This is conventional in the art.

A plurality of rollers 60 are mounted on frame of the conveyor at the inlet end 55 which mate with a runway (not shown) in framework 11, which allows the inlet end of the conveyor to be moved longitudinally with respect to framework 11. Conveyor drive motor 61 is mounted at the discharge end of conveyor housing 54, and drop chute 62 functions to funnel the material discharged from the conveyor in a downward direction.

OPERATION

Portable self-erecting silo assembly 10 is carried to a construction site by connecting a towing vehicle 19 to the fifth wheel connection 17 of framework 11. The assembly is towed in its collapsed or traveling configuration as illustrated in FIG. 6.

When the assembly is to be erected for operation, base frame 12 and the rear portion of framework 11 will usually be mounted on concrete piers 20 or similar support surfaces. Wheels 16 are usually maintained out of contact with the ground surface so that the wheels do not have to bear the load of the materials being handled by the assembly.

As is illustrated in the transition from FIG. 6 to FIG. 5, conveyor housing 54 is lifted by energizing winch motors 30 to lift rectangular frame 36 of conical container 14. Since annular flange 40 of cylindrical container 13 rests on laterally extending rectangular frame 36, the upward movement of rectangular frame 36 also lifts cylindrical container 13, and the combined upward movements of cylindrical container 13 and conical container 14 functions to lift the discharge end 56 of drag chain conveyor 15 upwardly. When the lower edge of drag chain conveyor 15 reaches the vicinity of the connecting tabs 42 of the two support posts 29 which are located on the side of base frame 12 adjacent conveyor 15, connecting rods 64 (FIG. 5) are inserted through the openings of connecting tabs 42 and openings (not shown) of the framework of drag chain conveyor 15. This connects drag chain conveyor 15 to the upper ends of posts 29. The conveyor is then disconnected from cylindrical container 13 and hoists 26 and 28 are then reversed to lower cylindrical container 13 and conical container 14 back to the positions as shown in FIG. 4. This moves the conveyor out of the door openings of the doors 45 and 49. Drag chain conveyor 15 is then connected to connecting tabs 52 at the upper edge of cylindrical container 13 and disconnected from support posts 29. Doors 45 and 49 of cylindrical container 13 and conical container 14, respectively, are then closed. Hoists 26 and 28 are again reversed so that they function to lift laterally extending rectangular frame 36 of conical container 14 in an upward direction, which again functions to lift cylindrical container 13 and the discharge end of drag chain conveyor 15 in an upward direction. The upward movement of discharge end 56 of the drag chain conveyor causes its inlet end 55 to move in a horizontal direction along framework 11 by means of the rollers 60 rolling in their channel (not shown) in framework 11.

When cylindrical container 13 has been lifted to a position where its connecting tabs 41 mate with the connecting tabs 42 at the upper ends of support posts 29 (FIG. 3), connecting pins 65 are inserted through the aligned apertures of the connecting tabs 41 and 42, to connect cylindrical container 13 to support posts 29.

Hoists 26 and 28 are then reversed to allow conical container 14 to move in a downward direction with respect to cylindrical container 13, until conical container 14 has been virtually removed from the confines of cylindrical container 13 (FIG. 2), whereupon screws 44 are inserted through annular flange 40 into engagement with conical container 14 to lock and substantially seal the containers together.

Connecting pins 65 are then removed from support tabs 41 and 42 of cylindrical container 13 and posts 29, so that cylindrical container 13 is supported from the framework of conical container 14. Hoists 26 and 28 are reversed to lift rectangular frame 36 of conical container 14 in an upward direction, which functions to move the discharge end 56 of conveyor 15, cylindrical container 13, and conical container 14 in an upward direction. When rectangular frame 36 of conical container framework 35 reaches the level of rectangular frame 22 of base support frame 12, connecting pins 66 (FIG. 1) are interconnected between the frames to rigidly connect the conical container 14 to base support 12. The space 24 between upright legs 21 of base frame 12 is then open and available for the passage of dump trucks 25 or similar road carrying vehicles to receive hot mix from the container assembly. Clam gates 23 pivot to open and close the discharge opening of conical container 14 to perform the dispensing function. After a truck has been loaded, the clam gates will close while another truck is positioned beneath the container assembly.

Drag chain conveyor 15 functions to transfer hot mix from inlet hopper 58 to discharge end 56, whereupon the hot mix drops through drop chute 62 into the container assembly. Inlet hopper 58 can be mechanically fed through another conveyor system (not shown) from a hot mix preparation plant, or can be manually fed by means of trucks or similar load carrying vehicles.

Portable self-erecting silo assembly 10 allows a mix preparation plant to function continuously, to discharge prepared asphaltic mix to dump trucks or the like, and when a dump truck is not available to be filled, the mix being prepared can be transferred to the portable self-erecting silo assembly. If several trucks return to the mix preparation site at close time intervals, some of the trucks can receive hot mix directly from the mix preparation plant while others of the trucks can be filled from the portable self-erecting silo assembly. Thus, hot mix can be prepared and stored when necessary and rapidly and expediently dispensed to load carrying vehicles, when available.

When the mix preparation site is to be moved, portable self-erecting silo assembly 10 can be collapsed from its operational configuration shown in FIG. 1 to its collapsed or transporting configuration as shown in FIG. 6 by a reversal of the steps previously described and illustrated in FIGS. 1—6. Connecting pins 66 are removed, hoists 26 and 28 are operated to lift rectangular frame 36 of conical chamber 14, whereby the assembly is lowered to the position shown in FIG. 2. Cylindrical chamber 13 is connected to upright supports posts 29 and conical chamber 14 is lifted up into cylindrical chamber 13 (FIG. 3). Cylindrical chamber 13 is disconnected from support posts 29 and carried by rectangular frame 36 of conical container 14, and cylindrical and conical containers 13 and 14 are lowered from the configuration shown in FIG. 3 down into the space 24 of base support frame 12 (FIG. 4) until drag chain conveyor 15 reaches the upper ends of the support posts 29 on the side of the conveyor. The conveyor is connected to support posts 29 and disconnected from cylindrical container 13. The doors 45 and 49 of containers 13 and 14 are opened, and the hoists function to lift the containers back in an upward direction so that the discharge end of drag chain conveyor 15 is received in the openings of doors 45 and 49 (FIG. 5). Drag chain conveyor 15 is then disconnected from support posts 29 and connected adjacent to the sill of the door 45 of cylindrical container 13. The assembly is then lowered back into the confines of space 24 of base frame 12, which is the traveling position shown in FIG. 6.

When the assembly is moved either from its operational or expanded position to its traveling or collapsed position, or in the reverse manner, the inlet end 55 of drag chain conveyor 15 moves laterally across framework 11 by means of its rollers 60 passing through its tracks on framework 11. This freedom of movement allows the conveyor to be lifted or lowered without any substantial sliding friction between the inlet end of the conveyor and the framework. When the assembly is in its expanded operational position, the inlet end 55 of drag chain conveyor 15 will be disposed substantially in horizontal plane and in an optimum attitude for the receipt of the asphaltic mix.

After the assembly has been moved to its expanded operational configuration, a handrail can be attached to the assembly, and step protrusions can be permanently connected to the upper surface of drag chain housing 54 to enable the operators to inspect the assembly, as may be desired.

Motors 30 of hoists 26 and 28 and motor 61 of drag chain conveyor 15 will normally be electric motors. However, in situations where electric power is not available, these motors can be replaced with conventional internal combustion engines, as may be desired.

The arrangement of the elements of the portable self-erecting silo assembly is such that the profile or height of the assembly is suitable for passage beneath most bridges and other overpasses on the public highway system, yet the assembly can be expanded to the height necessary to store the hot mix at an elevated height and dispense the mix to the standard size dump truck or similar load carrying vehicle. Furthermore, the assembly can be transformed from its traveling condition to its operational condition in a minimum amount of time and with only one operator. Thus, a single operator can drive the assembly to a new mix preparation site and transform the assembly from its traveling condition to its operational condition.

While this invention has been described in detail with particular reference to preferred embodiments thereof, it will be understood that variations and modifications can be effected within the spirit and scope of the invention as described hereinbefore and as defined in the appended claims.

I claim:

1. A portable storage apparatus of the type utilized to temporarily store heated asphaltic mix or the like comprising a portable and generally laterally extending framework, a base support frame connected to said framework at one end of said framework, an upright open ended outer container of substantially constant cross-sectional area over a major portion of its height telescopically received in said base support frame, an open ended inner container of converging cross-sectional area telescopically received in said outer container, lift means statically supported with respect to said base support frame for lifting said outer container and said inner container with respect to each other and with respect to said base support frame to upwardly extended positions, support means for holding said outer container and said inner container in their extended positions, and conveyor means having its inlet end positioned adjacent the other end of said framework and its delivery end positioned adjacent said base support fame, said conveyor means being movable with respect to said framework to move its delivery end in an upward direction over said outer container when in its extended position and to move its delivery end in a downward direction to a position adjacent said base support frame when said outer container is in its retracted position.

2. The invention of claim 1 wherein said conveyor means comprises a drag chain conveyor with its inlet end movably supported by said frame work in such a manner that the inlet end pivots and moves toward said base frame as the delivery end moves in an upward direction.

3. The invention of claim 1 wherein the delivery end of said conveyor means is primarily supported by said outer container.

4. The invention of claim 1 wherein said lift means comprises a plurality of upright support posts connected at their lower ends to said base support frame, motor driven hoist chains connected to the upper ends of said support posts for selectively lifting said outer container and said inner container with respect to each other and with respect to said base support frame.

5. The invention of claim 1 wherein said outer container is cylindrical and said inner container is conical and wherein said base support frame includes a plurality of upright legs engageable with the ground or similar supporting surface, and a laterally extending support frame connected to the upper portions of said legs and surrounding said outer container, and wherein said support means comprise connecting members connectable between said inner container and said laterally extending support frame to support said inner container from said laterally extending support frame.

6. A portable storage container assembly for temporarily storing asphaltic mix or the like comprising an elongated framework suitable for towing behind a motorized vehicle, a support frame carried by said framework at one of its ends and defining a space adjacent the ground surface for the passage of dump trucks or the like, a container including a converging lower end telescopically received in said support frame and movable from the space defined in said support frame in an upward direction generally above the space defined by said support frame, a conveyor having its inlet end supported by and movable with respect to the other end of said framework and its delivery end movable in upward and downward directions with said container.

7. The invention of claim 6 wherein said container is sectional and comprises an inner section of converging cross-sectional area and an outer section of substantially constant cross-sectional area along its length, said inner and outer sections being telescopically movable with respect to each other and with respect to said frame to assume a collapsed low profile configuration in the space defined in said support frame or to assume an extended high profile configuration above the space defined in said support frame.

8. The invention of claim 6 wherein said container comprises a closeable opening extending from its upper edge in a portion thereof adjacent said conveyor of a size and shape to receive said conveyor, whereby said conveyor is positionable with its delivery end at least partially within the confines of said outer container.